United States Patent
Kojima

(10) Patent No.: US 7,965,606 B2
(45) Date of Patent: Jun. 21, 2011

(54) INFORMATION RECORDING METHOD AND INFORMATION RECORDING APPARATUS

(75) Inventor: Yoshiaki Kojima, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 12/656,260

(22) Filed: Jan. 22, 2010

(65) Prior Publication Data

US 2010/0195472 A1 Aug. 5, 2010

Related U.S. Application Data

(63) Continuation of application No. 10/591,750, filed as application No. PCT/JP2005/03285 on Feb. 28, 2005, now abandoned.

(30) Foreign Application Priority Data

Mar. 4, 2004 (JP) .............................. P2004-061466

(51) Int. Cl.
*G11B 9/00* (2006.01)
*G11B 7/007* (2006.01)
*G11B 7/26* (2006.01)

(52) U.S. Cl. .................. 369/101; 369/126; 369/59.11; 250/492.3; 430/296; 430/942

(58) Field of Classification Search .............. 369/59.11, 369/101, 126, 53.2, 30.24, 47.34, 47.4, 93, 369/124.08, 124.14, 133, 189, 90, 239, 240, 369/275.4, 284, 44.11, 44.32, 53.3; 356/486; 250/492.3; 430/296, 942
See application file for complete search history.

(56) References Cited

U.S. PATENT DOCUMENTS

| | | | |
|---|---|---|---|
| 4,467,211 A | 8/1984 | Smith et al. | |
| 5,446,722 A | 8/1995 | Kojima et al. | |
| 6,307,826 B1 | 10/2001 | Katsumura et al. | |
| 6,482,493 B1 | 11/2002 | Kim | |
| 6,911,656 B2 | 6/2005 | Liu et al. | |
| 6,985,425 B2 | 1/2006 | Tsukuda et al. | |
| 7,113,360 B2 | 9/2006 | Formato et al. | |
| 7,135,676 B2 | 11/2006 | Nakasuji et al. | |
| 7,187,643 B2* | 3/2007 | Isshiki et al. | 369/275.4 |
| 7,200,095 B2 | 4/2007 | Kojima et al. | |
| 7,203,144 B2 | 4/2007 | Kumasaka et al. | |
| 7,218,470 B2 | 5/2007 | Deeman et al. | |
| 7,336,585 B2 | 2/2008 | Kumasaka et al. | |
| 7,359,305 B2* | 4/2008 | Tsukuda et al. | 369/101 |
| 2002/0033449 A1 | 3/2002 | Nakasuji et al. | |
| 2002/0060967 A1 | 5/2002 | Yamada et al. | |
| 2002/0186632 A1 | 12/2002 | Kumasaka et al. | |
| 2004/0021976 A1* | 2/2004 | Deeman et al. | 360/75 |
| 2005/0063264 A1* | 3/2005 | Miyamoto et al. | 369/47.4 |

FOREIGN PATENT DOCUMENTS

| | | |
|---|---|---|
| JP | 02-015889 | 1/1990 |
| JP | 06-103615 | 4/1994 |

(Continued)

*Primary Examiner* — Wayne R Young
*Assistant Examiner* — Dionne H Pendleton
(74) *Attorney, Agent, or Firm* — Drinker Biddle & Reath LLP

(57) ABSTRACT

To provide a new recording method and recording apparatus with respect to an optical recording medium, the recording method and recording apparatus being able to deal with a high density of an optical recording medium of recent years. Recording of a recording track and a prepit is carried out by sequentially deflecting a single beam.

17 Claims, 3 Drawing Sheets

FOREIGN PATENT DOCUMENTS

| | | |
|---|---|---|
| JP | 06-131706 | 5/1994 |
| JP | 06-243510 | 9/1994 |
| JP | 11-283283 | 10/1999 |
| JP | 2002-367178 | 12/2002 |

* cited by examiner

DEFLECTION SIGNAL IN X-DIRECTION

DEFLECTION SIGNAL IN Y-DIRECTION

INFORMATION RECORDING METHOD AND INFORMATION RECORDING APPARATUS

This is a continuation application of application Ser. No. 10/591,750, having a §371 date of Sep. 1, 2006 now abandoned, which is a national stage filing based on PCT International Application No. PCT/JP05/03285, filed on Feb. 28, 2005. The application Ser. No. 10/591,750 is incorporated by reference herein in its entirety.

TECHNICAL FIELD

The present invention relates to an information recording method and an information recording apparatus for recording a recording track and a prepit into an original disk.

BACKGROUND ART

There are optical recording mediums such as DVD-R (Digital Versatile Disc-Recordable) of a recordable type and a DVD-RW (Digital Versatile Disc-Rewritable) which can record data. These optical recordable mediums ordinarily have a recording track for recording information used by a user and a prepit for recording rotation control information such as a wobbling signal used to control rotation of optical recording medium and address information necessary for detecting position in recording data on it. The above prepit is formed between the recording tracks.

Heretofore, when the recording track and the prepit are recorded onto the original disk to be used for manufacturing such the optical recording medium, an information recording apparatus utilizing a laser beam is used, the laser beam is separated into two beams, one of the separated beams records a recording track, and the other of the beams records the prepit.

Meanwhile, in recent years, a recording track having an ultra fine pitch is desired and research and development on a recording medium having a high density beyond DVD are pursued.

However, in a conventional recording method using laser beam, a recording resolution is limited by a spot size of laser beam which is affected by the wavelength of the laser beam and a number of aperture (NA) of objective lens. Therefore, it is impossible to record a fine track.

In order to solve the problem, an information recording method using an electron beam which has a beam spot diameter smaller than laser beam and can demonstrate an improvement of a recording resolution has been examined by now. (For example, Patent Document 1)

Patent Document 1: Japanese Unexamined Patent Publication JP-A-6-131706.

DISCLOSURE OF THE INVENTION

Problems to be Solved by the Invention

However, it is very difficult to divide an electron beam into two portions. Accordingly, when a recording track and a prebit and a recording track are recorded, it is necessary to frequently move any one or both of an optical recording medium and the electron beam.

The present invention is provided in consideration of the above problem, an example of the object is to newly provide an information recording method for recording onto an original disc and an information recording apparatus, which can deal with high density of an optical recording medium in recent years.

Means for Solving the Problem

According to claim 1, in order to solve the problem, there is provided an information recording method which records a recording track and a prepit positioned between the recording tracks into an original disc, wherein the recording track and the prepit are recorded by appropriately deflecting a single beam in a radius direction of the original disc and a tangential direction of the original disc while the original disc goes into a 360-degree roll.

According to claim 2, in order to solve the problem, there is provided an information recording method which records a recording track and a prepit positioned between the recording tracks into an original disc, wherein Steps 1-4 are sequentially repeated. (Step 1) The recording track is recorded by irradiating a beam onto the original disc while the original disc goes into a 360-degree roll. (Step 2) When a predetermined position on the original disc comes, the beam used to record the recording track is deflected to where the prepit is to be formed on the original disc. (Step 3) Recording the prepit by irradiating the beam onto the original disc. (Step 4) When a predetermined position on the original disc comes, the beam is again deflected to the position where the beam has been previously deflected from recording of the recording track to recording of the prepit.

According to claim 4, in order to solve the problem, there is provided the information recording apparatus including a rotation driving unit for supporting and rotating the original disc, a movement driving unit for moving the rotation driving unit in a direction of radius of the original disc, and a beam irradiating means for irradiating a single beam onto the original disc so as to be freely deflectable, further including a deflection signal generating means for generating a radius direction deflection signal for deflecting the single beam in a radius direction of the original disc and a tangential direction deflection signal for deflecting to a tangential direction of the original disc, and a beam deflecting unit for deflecting the single beam on the basis of the radius direction deflection signal and the tangential direction deflection signal, wherein a track and a prepit are recorded on the original disc using the single beam which is deflected in the radius and tangential directions while the original disc goes into a 360-degree roll.

EXPLANATION OF NUMERICAL REFERENCES

T1, T2 . . . Recording track
P1 . . . Prepit
10 . . . Electron Beam Recorder
15 . . . Original Disc
16 . . . Turn Table
25 . . . Controller
30 . . . Transfer and rotation control unit
40 . . . Electron Beam Column Unit
45 . . . Beam Deflection Electrode
55 . . . Beam Deflecting Unit

BEST MODE FOR CARRYING OUT THE INVENTION

Hereinafter, an information recording method and an information recording apparatus with respect to an optical recording medium according to the present invention will be more concretely described in reference of figures.

The method of the present application is an information recording method of recording a recording track and a prepit positioned between the tracks onto an original disc, wherein it is characterized that a single beam is appropriately deflected in recording the prepit.

According to the present application, when both of a recording track and a prepit are recorded, it is possible to use only a single beam without using a plurality of beams or dividing a beam into two portions. Further, since it is unnecessary to divide the beam, an electron beam can be used. As a result, it is possible to deal with high density of an optical recording medium.

The following method can be mentioned as an example of the present application.

(Step 1)

A beam is irradiated onto an original disc to record a recording track.

(Step 2)

When a predetermined position on the original disc comes, the beam used to record the recording track is deflected to where a prepit should be recorded onto the original disc.

(Step 3)

The prepit is recorded by irradiating the beam onto the original disc.

(Step 4)

When a predetermined position on the original disc comes, the beam is again deflected from a position where the beam has been once deflected from recording of the recording track to the recording of the prepit.

The above various steps will be described in reference of FIG. 1.

Figure 1:
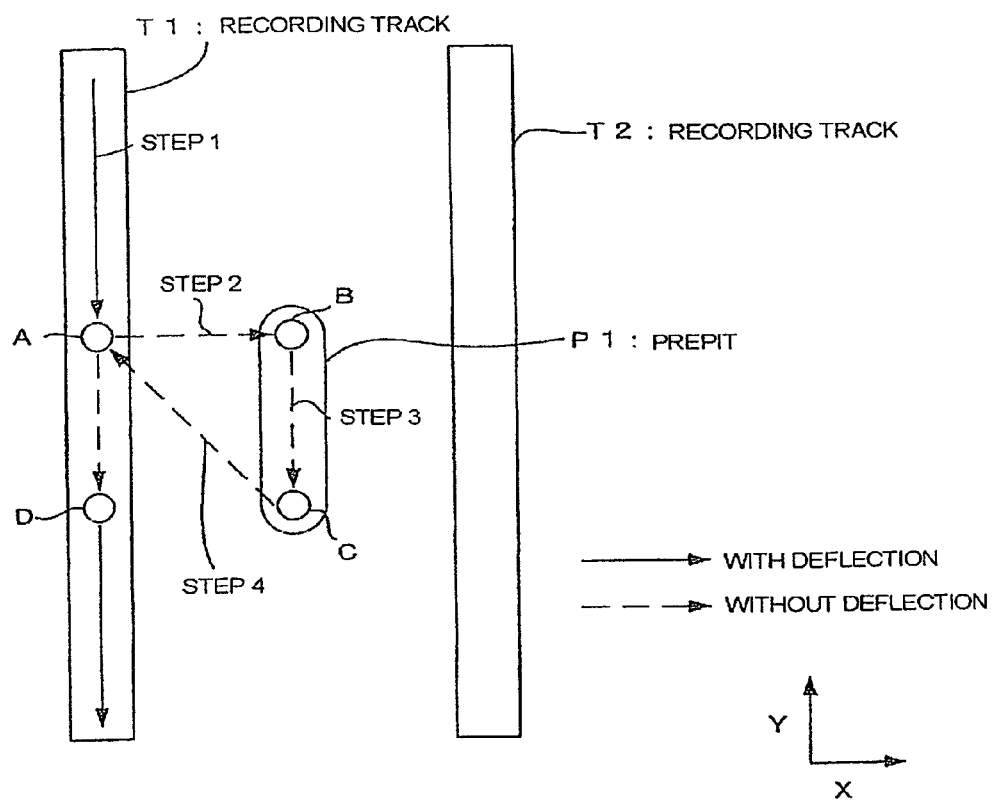
FIG. 1 An explanatory view for explaining an information recording method for recording a recording track and a prepit onto an original disc.

FIG. 1 is an explanatory view for showing a recording method of the recording track and the prepit to the original disc of the present application. As shown in FIG. 1, it is necessary to produce, on a surface of an original disc used for manufacturing an optical recording medium in a rewritable type such as DVD-RW, recording tracks T1, T2 for recording information used by a user and a prepit P1 for recording rotation control information such as a wobbling signal that is used for a rotational control of an optical recording medium, address information or the like that is necessary for searching positions of data in recording the data, or the like. As shown in FIG. 1, the prepit P1 is ordinarily formed between the recording tracks T. Further, in FIG. 1, although the recording tracks as many as two and the prepit as many as one are shown, a large number of the tracks and prepits are ordinarily formed.

As a method for recording a recording track and a prepit, according to a method of the present application, the recording track T1 is recorded by irradiating a beam onto an original disc (Step 1). This step is similar to a conventional method, and the conventionally known method may be used. In an ordinary case, the beam itself is fixed and the original disc is rotated. As to the beam, any beam can be used without specifically limiting the method of the present invention. However, in order to maximally demonstrate advantages of the present application, a use of electron beam is preferable.

The recording track T1 is recorded at a predetermined speed. When it reaches a predetermined position A on an original disc, a recording track T1 is once stopped to record (namely, the beam is turned off), and the beam used to record the recording track is deflected (so-called jumping) onto the original disc where a prepit P1 is to be recorded (Step 2). Here, it is unnecessary to specifically limit the predetermined position A on the original disc and it can be arbitrarily set up. However, it is preferable to cause deflection at a position where a distance between a recording position on the recording track T1 and the prepit P1 to be recorded is closest (i.e. position A in FIG. 1) in consideration of a deflection distance of the beam. When such the change is carried out at the position A in FIG. 1, the beam deflects in a radius direction (a direction of X axis in the figure) of the original disc.

Further, in the method of the present invention, as for a means for deflecting beam is not specifically limited and a conventionally known method can be used. Specifically, it is possible to use a deflector using static electric force, a deflector using magnetic force or the like.

After deflecting the beam at a position where the prepit P1 is recorded (position B in FIG. 1), the beam is irradiated onto the original disc and information is continuously recorded until a predetermined position C on the original disc comes (Step 3).

Here, the predetermined position C in the original disc is not specifically limited and can be arbitrarily set up in advance. It is ordinarily at an end of prepit. Further, as to a recording method of recording the prepit to the predetermined position C on the original disc may be carried out by fixing the beam and rotating the original disc in a manner similar to the recording method of the recording track. However, it is also possible to further deflect the beam to the predetermined position C on the original disc. As such, by carrying out recording of the prepit in use of deflection of the beam, it is possible to record at a rate of a rotational speed of the original disc or more. As a result, it is preferable because a position of restarting recording of the recording track T1 is immediately retrieved in the following step. The deflection of the beam in this occasion (namely, B to C of FIG. 1) differs from a deflection direction in Step 2, and the beam deflects in a tangential direction of the original disc (namely, a direction of axis Y shown in the figure, which direction is adverse to the rotational direction of the original disc). For example, in a case where the original disc rotates at a speed of v, by recording with deflection of the original disc at a speed of v in the tangential direction (adverse to the rotational direction), it becomes possible to records at a rate of 2v. Then it is possible to complete the recording within a half of the time ordinarily required.

After recording the prepit P1 at a predetermined speed and a predetermined position C on the original disc (namely an end position of the prepit) comes, recording of prepit P1 is stopped to be recorded (namely the beam is turned off), and the beam is again deflected (i.e. jumped) to the position A shown in FIG. 1, which position is the deflected position from recording of the recording track to the recording of the prepit (Step 4).

The deflection carried out here is similar to that in the above Step 2.

After the change, the beam is turned on, and the recording of the track T1 is restarted. At this moment, the prepit P1 is not recorded, and it is preferable to continue the deflection to a position D (D shown in FIG. 1) where the beam spot for recording the recording track exists provided that the recording track T1 would have been recorded. By this, it is possible to recover retard of recording the recording track T1 which has occurred because the prepit P1 had been recorded.

According to the method of the present invention, it is possible to record the recording track T1 and the prepit P1 with only a single beam by appropriately repeating the above Steps 1 to 4.

Next, an example of the apparatus according to the present application will be described in use of an example of the preset application.

Figure 2:
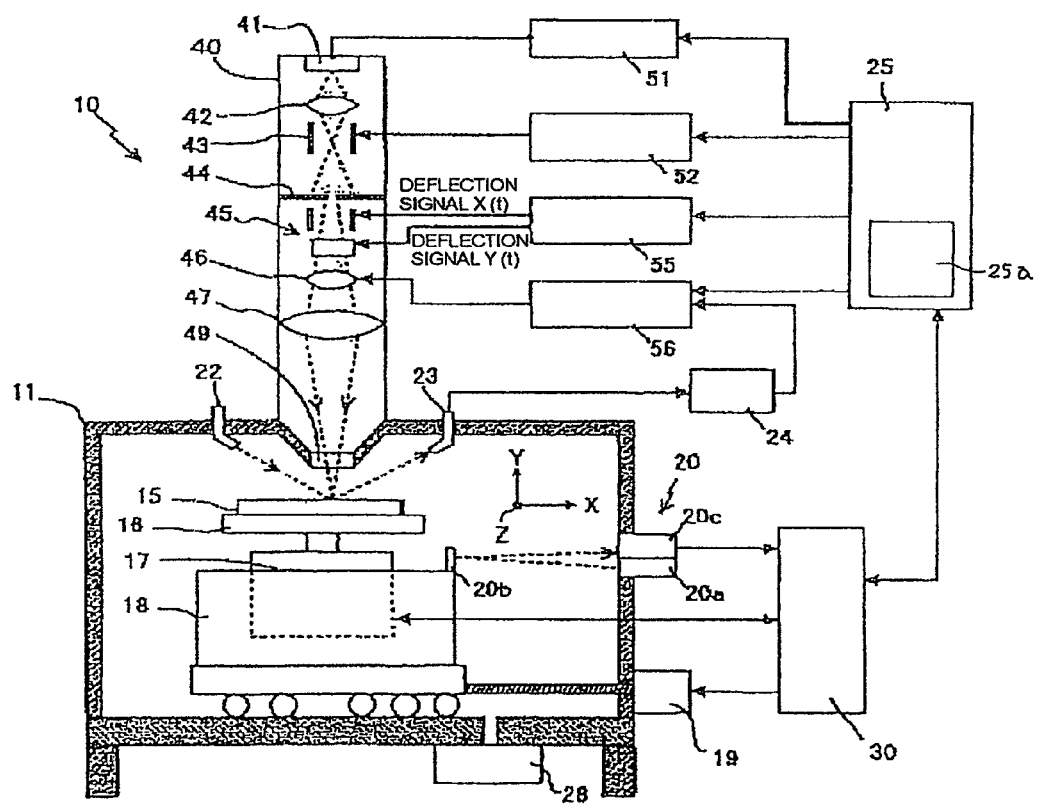
FIG. 2 A schematic block diagram of an electron beam recorder 10 as being an information recording apparatus according to the present application.

FIG. 2 is a block diagram schematically showing an electron beam recorder 10 as an information recording apparatus of the present application.

Since an electron beam has a characteristic of being extremely attenuated in the atmosphere, electron beam exposure is undertaken within a vacuum atmosphere. Therefore, the electron beam recorder 10 has a vacuum chamber 11 for accommodating a driving mechanism and so on for rotating and translationally driving an original disc 15 of optical recording medium. On a vertically upper side of a principle surface of vacuum chamber 11, there is an electron beam column unit 40 for emitting an electron beam. The electron beam recorder 10 includes a control unit outside the vacuum chamber 11.

A vacuum pump 28 is connected to the vacuum chamber 11. By evacuating air inside the chamber, it is set up to make the inside of the chamber have a vacuum atmosphere of a predetermined pressure. The vacuum chamber 11 is located on a floor through a vibration isolation system (not shown) such as an air dumper to thereby avoid transmission of vibration from the outside. For example, a silicone substrate is used for the original disc 15, and a resist film for electron beam is provided on the principle surface thereof.

Latent images of micro indented pattern for the recording track and the prepit are formed on the resist layer along a locus of the electron beam irradiated onto the original disc while translationally moving thus rotating original disc in a horizontal direction.

<Rotation Driving Unit and Relative Motion Driving Unit>

As shown in FIG. 2, inside the vacuum chamber, the original disc 15 is mounted on a turn table 16 and rotated with a spindle motor 17. The original disc 15 is driven to rotate with respect to a vertical axis in a center of the principle surface. The spindle motor 17 may be of an anti-magnetic type having an air spindle structure which can be used in the vacuum. The spindle motor 17 is mounted on a feed stage (hereinafter referred to as a stage) 18 that can be linearly transferred by a slider.

The stage 18 is connected to a feed mechanism 19 for transferring with a DC motor so that the spindle motor 17 and the turn table 16 are movable on a surface in a horizontal direction which is in parallel to the principal surface of the original disc 15. The spindle motor 17 and the feed mechanism 19 are connected to the feed and rotation control unit 30. The feed and rotation control unit 30 carries out a feedback servo control of the rotation on the basis of the output from an encoder of the spindle motor 17 and also a feedback servo control of a speed of the stage 18 by driving the feed mechanism 19 in use of data of a measured length obtained from a radius sensor 20 utilizing a laser end-measuring machine. The feed and rotation control unit 30 controls to make the number of revolution of the spindle motor 17 and a feed distance of the feed mechanism 19 constant in reference of a predetermined track pitch supplied from the controller 25 and the measured length data. Meanwhile, concerning the radius sensor 20, a laser light source 20a and a light detector 20c, respectively a part of the radius sensor, are provided inside a side wall of the vacuum chamber 11, and a reflection mirror 20b for reflecting a laser beam from the laser light source is fixed to the stage 18.

The feed and rotation control unit 30 outputs positional data of the original disc to the controller 25. The controller 25 has a clock synchronism circuit for generating a synchronism clock to make a signal of a positional data of an original disc from the feed and rotation control unit 30 and a modulation signal corresponding to a recording track to be recorded and a prepit synchronize. Thus synchronized modulation signal is supplied to a beam modulation unit 52 described below. As such, the controller 25 and the feed and rotation control unit 30 makes the rotational original disc and the stage 18 move at a predetermined pitch with the feed mechanism 19.

Further, the controller 25 has an electron beam deflection signal generation unit 25a. This electron beam deflection signal generation unit 25a respectively generates a radius deflection signal X(t) and a tangential deflection signal Y(t) and outputs thus generated to the controller 25. The controller 25 makes a signal of the position data and a modulation signal synchronize with the electron beam deflection signal, and outputs such the electron beam deflection signal to the beam deflection unit 55 described below.

<Exposure Beam Emission Unit>

On the inner wall of the vacuum chamber 11 and in the vicinity of the electron beam column unit 40, a focus sensor made up of a laser beam source 22 and a light detector 23 is located to face a laser beam emission surface so as to optically detect a height of the principle surface of the original disc 15. The light detector 23 supplies a light receiving signal to a height detector 24. The height detector 24 detects height data of the principle surface of the original disc 15 on the basis of the light receiving signal and sends it to a focusing unit 56.

Inside the electron beam column unit 40 over the vacuum chamber 11, an electron gun 41, a converging lens 42, a blanking electrode 43, an on-off control aperture 44, a beam deflection electrode 45, a focus adjusting lens 46, and an objective lens 47 are arranged in this order. An electron beam emission port 49 provided on the tip end of the electron beam column 40 is directed to the original disc 15. When the electron beam emitted from the electric gun 41 passes through an opening portions of aperture 44 for controlling on and off, the electron beam is converged with the objective lens 47 and impinges upon the principle surface of the original disc to thereby form a minute electron beam spot on the principle surface.

The electron gun 41 emits an electron beam which is accelerated by a high voltage of several tens of KeV from an accelerating high voltage power source 51. The converging lens 42 converges the electron beam thus emitted and guides it to an aperture 44. The blanking electrode 43 is controlled by the beam modulation unit 52 and modulates strength of the electron beam on the basis of a modulation signal from the controller 25. Namely, the beam modulation unit 52 supplies a modulation signal to the blanking electrode to largely deflect an electron beam which passes through it. As such, the electron beam is turned off by stopping a pass of the electron beam to the aperture 44, and turned on by allowing the pass.

The beam deflection electrode 45 is made up of oppositely and orthogonally arranged electrode sets. The electron beam can be deflected independently in two directions (X,Y), along an axis in parallel to the radius of the original disc on a surface parallel to a principle surface of the original disc and an axis perpendicular to the above axis. These two-axis electrodes in the beam deflection electrode 45 are respectively controlled by a radius deflection signal X(t) and a tangential deflection signal Y(t) from the beam deflection unit 55 to thereby deflect the electron beam thus passed respectively in the directions of the axes. The beam deflection unit 55 generates the deflation signals X(t) and Y(t) on the basis of the electron beam deflection signal from the controller 25. By these signals, the beam deflection electrode 45 deflects the passing electron beam in response to the radius deflection signal so that a spot of the electron beam is moved on a radius of the original disc at a pitch of one track per one rotation of the original disc. Further, the beam deflection unit 55 corrects a residual error component on the basis of the measured length data from the radius sensor 20 and the rotational number data from the encoder of the spindle motor 17 to generate the deflection signals X(t), Y(t) and conducts a positional control of the electron beam spot on the principle surface of the original disc 15. As such, the beam modulation unit 52 of the emission control unit supplies an instruction for modulating the strength the exposure beam in response to data to be recorded to the beam deflection electrode 45.

Figure 3:
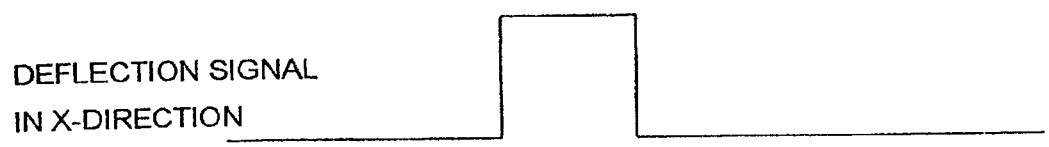
FIG. 3 A view for showing a deflection signal used in the information recording apparatus shown in FIG. 2.
Figure 3:
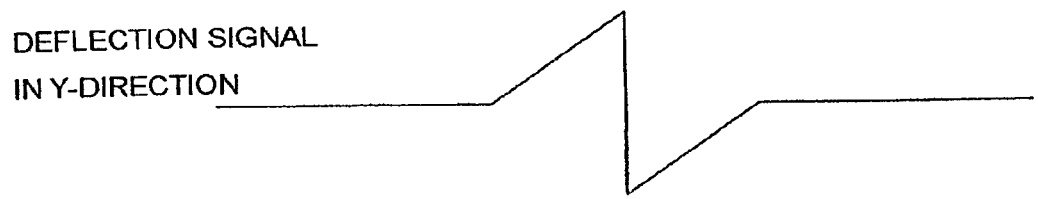

An example of the electron beam deflection signal used in the present invention is illustrated in FIG. 3.

The focus adjusting lens 46 is controlled by the focusing unit 56, and the focusing unit 56 performs focusing adjustment of the electron beam spot which is converged on the principal surface of the original disc 15 with the objective lens 47 on the basis of a detection signal from the height detection unit 24. The accelerating high voltage power source 51 and the focusing unit 56 are operated on the basis of the control signal from the controller 25.

The beam deflection unit 55 supplies the deflection signal as shown in FIG. 3 to the beam deflection electrode 45 to thereby appropriately deflect the electron beam as explained in reference of FIG. 1.

The rotational control unit 30 supplies, to the feed mechanism 19, an instruction of moving by a track pitch per rotation of original disc. At the same time, the beam deflection unit 55 supplies an instruction of sequentially moving by a distance between a recording track and a prepit to the beam deflection electrode 45 so as to satisfy a relationship between rotation of the original disc and the amount of beam deflection. Further, when the beam jumps from the recording track to the prepit, the beam modulation unit 52 supplies a blanking instruction to the beam deflection electrode 45 to make the beam strength zero.

In accordance with such the deflection operation of the sequential modulation beam spot, the resist layer of the original layer has a recording track and a prepit recorded in it along a locus shown in FIG. 1. Thus, the information recording process ends.

Although the present invention is limited to recording of the recording track and the prepit positioned between the recording tracks, the present invention is similarly applicable when information is reproduced.

Further, the present invention is not limited to the above embodiments. The above embodiments are examples. As long as a structure which is substantially the same as that in the technical idea recited in the Scope of Claims of the present invention and demonstrates a function and effect similar to those of the present invention may be included in a technical scope of the present invention.

The invention claimed is:

1. A method for forming a first latent image for forming a track and a second latent image with a single beam, said method comprising, while an original disc rotates one turn, at least once performing:
    a first step of forming said first latent image by irradiating said original disc with said single beam;
    a second step of deflecting, when said single beam has reached a first position on said original disc while forming said first latent image, said single beam used for forming said first latent image, in a radial direction of said original disc to a second position on said original disc at which said second latent image is to be formed;
    a third step of forming said second latent image by deflecting said single beam in a tangential direction of said original disc while irradiating said original disc with said single beam; and
    a fourth step of deflecting said single beam to a position at which said first latent image is to be formed, when said single beam has reached a predetermined third position other than said second position.

2. The forming method of claim 1, wherein said single beam is deflected from said second position to said third position when said second latent image is being formed.

3. The forming method of claim 1, wherein said first position is a position where a position of formation of said first latent image and a start position of formation of said second latent image are closest to each other.

4. The forming method of claim 1, wherein said third position is at an end of said second latent image.

5. The forming method of claim 1, wherein, in said fourth step, the formation of said first latent image is restarted by deflecting said single beam.

6. The forming method of claim 5, wherein, in said fourth step, a position to restart the formation of said first latent image is a position on said original disc where said single beam is deflected from a position of formation of said first latent image to a position of recording of said second latent image.

7. The forming method of claim 1, wherein, in said third step, said second latent image is formed at a speed higher than a speed at which said first latent image is formed.

8. The forming method of claim 7, wherein, in said third step, said second latent image is formed while deflecting said single beam in a direction opposite to a direction of rotation of said original disc.

9. The forming method of claim 1, wherein said first latent image and said second latent image are formed in the form of adjoining arcs.

10. The forming method of claim 1, further comprising:
    a fifth step of forming said first latent image, for a predetermined time period after the formation of said first latent image is restarted, at a speed higher than a speed at which said first latent image is formed in said first step.

11. A manufacturing method of an exposed original disc for forming a first latent image for forming a track and a second latent image with a single beam, said method comprising, while an original disc rotates one turn, at least once performing:
    a first step of forming said first latent image by irradiating said original disc with said single beam;
    a second step of deflecting, when said single beam has reached a first position on said original disc while forming said first latent image, said single beam used for forming said first latent image, in a radial direction of said original disc to a second position on said original disc at which said second latent image is to be formed;
    a third step of forming said second latent image by deflecting said single beam in a tangential direction of said original disc while irradiating said original disc with said single beam; and
    a fourth step of deflecting said single beam to a position at which said first latent image is to be formed, when said single beam has reached a predetermined third position other than said second position.

12. A manufacturing method of an exposed original disc for forming a first latent image for forming a track and a second latent image with a single beam, said method comprising:
   while forming said first latent image at a first position, deflecting said single beam in a radial direction of said original disc in response to a reception of a first deflection signal; and forming said second latent image at a second position by deflecting, in a tangential direction of said original disc, said single beam deflected by said first deflection signal;
   and deflecting said single beam to a position at which said first latent image is to be formed, when said single beam has reached a predetermined third position other than said second position.

13. The manufacturing method of claim 12, wherein said single beam is deflected by a second deflection signal to a position where said track is to be formed.

14. A manufacturing apparatus of an exposed original disc which forms a first latent image for forming a track and a second latent image with a single beam, said apparatus comprising, while said original disc rotates one turn, at least once performing:
   a first step of forming said first latent image by irradiating said original disc with said single beam;
   a second step of deflecting, when said single beam has reached a first position on said original disc while forming said first latent image, said single beam used for forming said first latent image, in a radial direction of said original disc to a second position on said original disc at which said second latent image is to be formed;
   a third step of forming said second latent image by deflecting said single beam in a tangential direction of said original disc while irradiating said original disc with said single beam; and
   a fourth step of deflecting said single beam to a position at which said first latent image is to be formed, when said single beam has reached a predetermined third position other than said second position.

15. A manufacturing apparatus of an exposed original disc which forms a first latent image for forming a track and a second latent image with a single beam, said apparatus comprising:
   a first control part of forming said first latent image by irradiating said original disc with said single beam;
   a second control part of deflecting, when said single beam has reached a first position on said original disc while forming said first latent image, said single beam used for forming said first latent image, in a radial direction of said original disc to a second position on said original disc at which said second latent image is to be formed;
   a third control part of forming said second latent image by deflecting said single beam in a tangential direction of said original disc while irradiating said original disc with said single beam; and
   a fourth control part deflecting said single beam to a position at which said first latent image is to be formed, when said single beam has reached a predetermined third position other than said second position.

16. A manufacturing apparatus of an exposed original disc which forms a first latent image for forming a track and a second latent image with a single beam, said apparatus performs operation of:
   while forming said first latent image at a first position, deflecting said single beam in a radial direction of said original disc in response to a reception of a first deflection signal; and forming said second latent image at a second position by deflecting, in a tangential direction of said original disc, said single beam deflected by the first deflection signal;
   and deflecting said single beam to a position at which said first latent image is to be formed, when said single beam has reached a predetermined third position other than said second position.

17. The manufacturing apparatus of claim 16, wherein said single beam is deflected by a second deflection signal to a position where said track is to be formed.

* * * * *